(12) United States Patent
Hamilton et al.

(10) Patent No.: US 7,521,279 B2
(45) Date of Patent: Apr. 21, 2009

(54) IMAGE PROJECTION AT DIFFERENT IMAGE PLANES

(75) Inventors: Alistair R. Hamilton, Stony Brook, NY (US); Ron Goldman, Cold Spring Harbor, NY (US); Shane MacGregor, Forest Hills, NY (US); Emmanuel Tanghal, Mason, OH (US)

(73) Assignee: Symbol Technologies, Inc., Holtsville, NY (US)

( * ) Notice: Subject to any disclaimer, the term of this patent is extended or adjusted under 35 U.S.C. 154(b) by 389 days.

(21) Appl. No.: 11/061,690

(22) Filed: Feb. 18, 2005

(65) Prior Publication Data

US 2006/0187423 A1    Aug. 24, 2006

(51) Int. Cl.
*H01L 21/00*    (2006.01)
*G09G 3/00*    (2006.01)

(52) U.S. Cl. .................. 438/64; 438/800; 257/E33.067; 257/E33.058; 345/31

(58) Field of Classification Search .................. 438/57, 438/64, 800, 26, 121; 257/E33.067, E33.058; 345/31, 32, 901
See application file for complete search history.

(56) References Cited

U.S. PATENT DOCUMENTS

| 5,032,924 | A | * | 7/1991 | Brown et al. | ................. | 348/759 |
|---|---|---|---|---|---|---|
| 5,418,546 | A | * | 5/1995 | Nakagakiuchi et al. | ........ | 345/85 |
| 5,483,250 | A | * | 1/1996 | Herrick | ........................ | 345/32 |
| 6,233,138 | B1 | * | 5/2001 | Osgood | ....................... | 361/681 |
| 6,262,885 | B1 | * | 7/2001 | Emma et al. | ................. | 361/683 |
| 6,525,750 | B1 | * | 2/2003 | Knox | ........................... | 345/30 |
| 6,532,146 | B1 | * | 3/2003 | Duquette | ..................... | 361/681 |

* cited by examiner

*Primary Examiner*—Caridad M Everhart
(74) *Attorney, Agent, or Firm*—Kirschstein, et al.

(57) ABSTRACT

An image projection module within a housing is operative for causing selected pixels in a raster pattern to be illuminated to produce an image at different image planes of VGA quality. A movable component on the housing causes the image to be formed at a selected image plane.

6 Claims, 12 Drawing Sheets

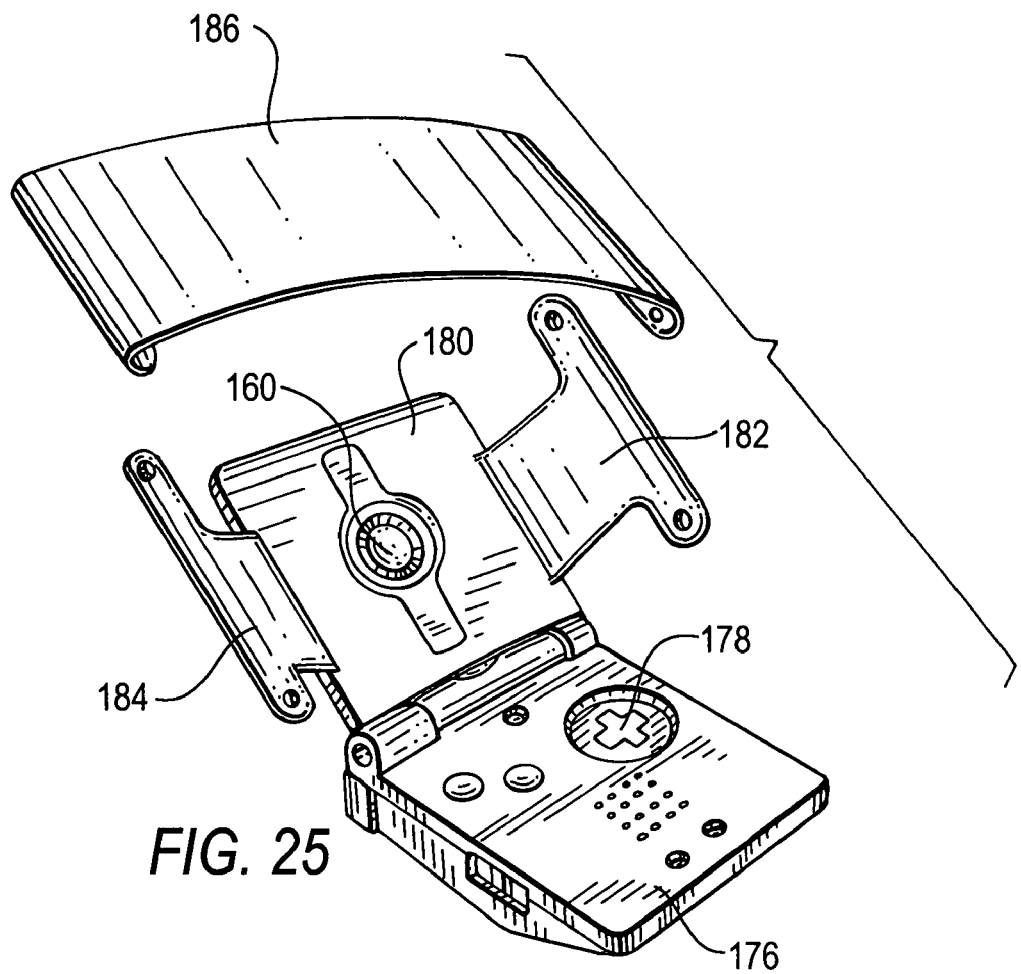
FIG. 25
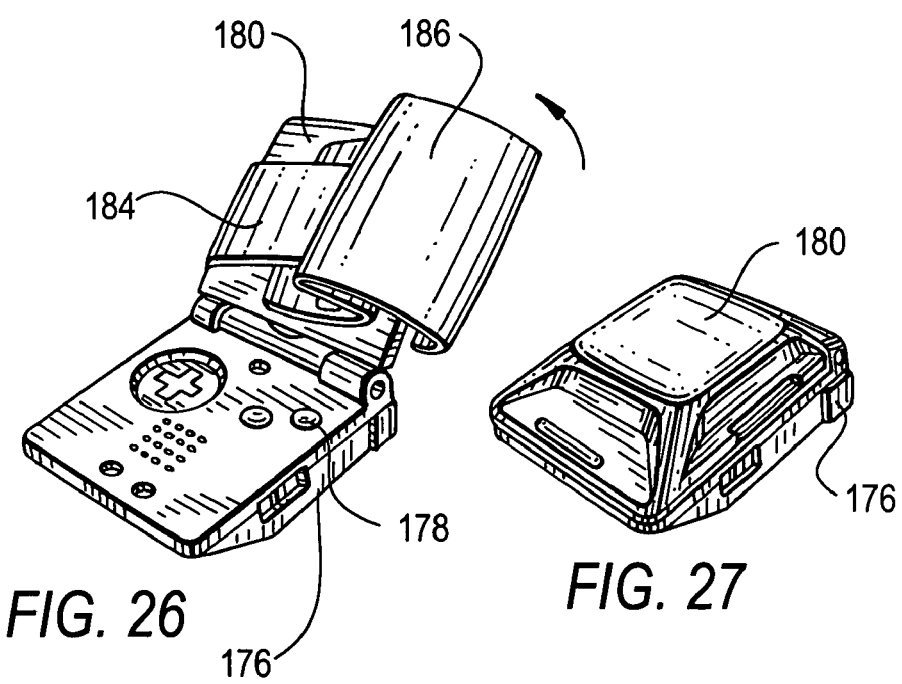
FIG. 26
FIG. 27

IMAGE PROJECTION AT DIFFERENT IMAGE PLANES

BACKGROUND OF THE INVENTION

1. Field of the Invention

The present invention generally relates to projecting two-dimensional images at different image planes, especially using single mode laser sources.

2. Description of the Related Art

It is generally known to project a two-dimensional image on a screen based on a pair of scan mirrors which oscillate in mutually orthogonal directions to scan a laser beam over a raster pattern. However, the known image projection systems project an image of limited resolution, typically less than a fourth of video-graphics-array (VGA) quality of 640×480 pixels, and at a single image plane. As such, the known projection systems have limited versatility.

SUMMARY OF THE INVENTION

Objects of the Invention

Accordingly, it is a general object of this invention to provide an image projection system that projects a sharp and clear, two-dimensional image at a plurality of different image planes.

Another object of this invention is to project images of large size.

Still another object of this invention is to project images on and off a housing that contains the image projection system.

Features of the Invention

In keeping with these objects and others which will become apparent hereinafter, one feature of this invention resides, briefly stated, in an arrangement for projecting a two-dimensional image, the arrangement including a housing having a window, an image projection module in the housing for sweeping a pattern of scan lines through the window, each scan line having a number of pixels, and for causing selected pixels to be illuminated, and rendered visible, to produce the image; and a movable component mounted on the housing for movement between different positions in which the image is projected onto different imaging planes.

In accordance with one feature of this invention, the movable component is a panel pivotably mounted on the housing for movement between one of the positions in which the panel serves as a display screen on which the image is projected, and another of the positions in which the panel serves as a support for supporting the housing in a tilted state, thereby allowing the image to be projected onto a display surface remote from the housing. Thus, the user has the option of displaying the image on the housing for private viewing of the image, or off the housing for public viewing, thereby increasing its versatility.

The panel can also be mounted for linear movement toward and away from the housing, thereby enabling the on-board viewing to be effected at different distances from the housing for even greater versatility.

Still another feature of this invention is to provide a display screen on the housing and to move the component such that an image is projected onto the screen, or remotely from the screen. In this case, the component is a slidable hatch or cover normally overlying the window, and a mirror is mounted on the cover for joint movement therewith. When the cover overlies the window, the scan lines reflect off the mirror onto the display screen. When the cover is moved away from the window, the scan lines pass through the window onto a remote display surface.

In all of the above-described embodiments, the image is selectively produced at different image or target planes. This contrasts with the prior art wherein an image is only produced at a single image plane.

Yet another feature resides in folding and unfolding a display screen to create a wide screen. The screen can be made of a flexible material and can be folded onto itself for compact storage, or unfolded and spread to a wide format. The screen can also be made of a stretchable material and stretched from an initial size to a wider, final size, again to create a wide screen format.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 25 is an exploded, perspective view of yet another image projection arrangement in accordance with this invention;

FIG. 26 is a perspective view of the arrangement of FIG. 25 during folding of a display screen;

FIG. 27 is a perspective view of the arrangement of FIG. 26 after the display screen has been folded;

DETAILED DESCRIPTION OF THE PREFERRED EMBODIMENTS

Figures 1, 2:
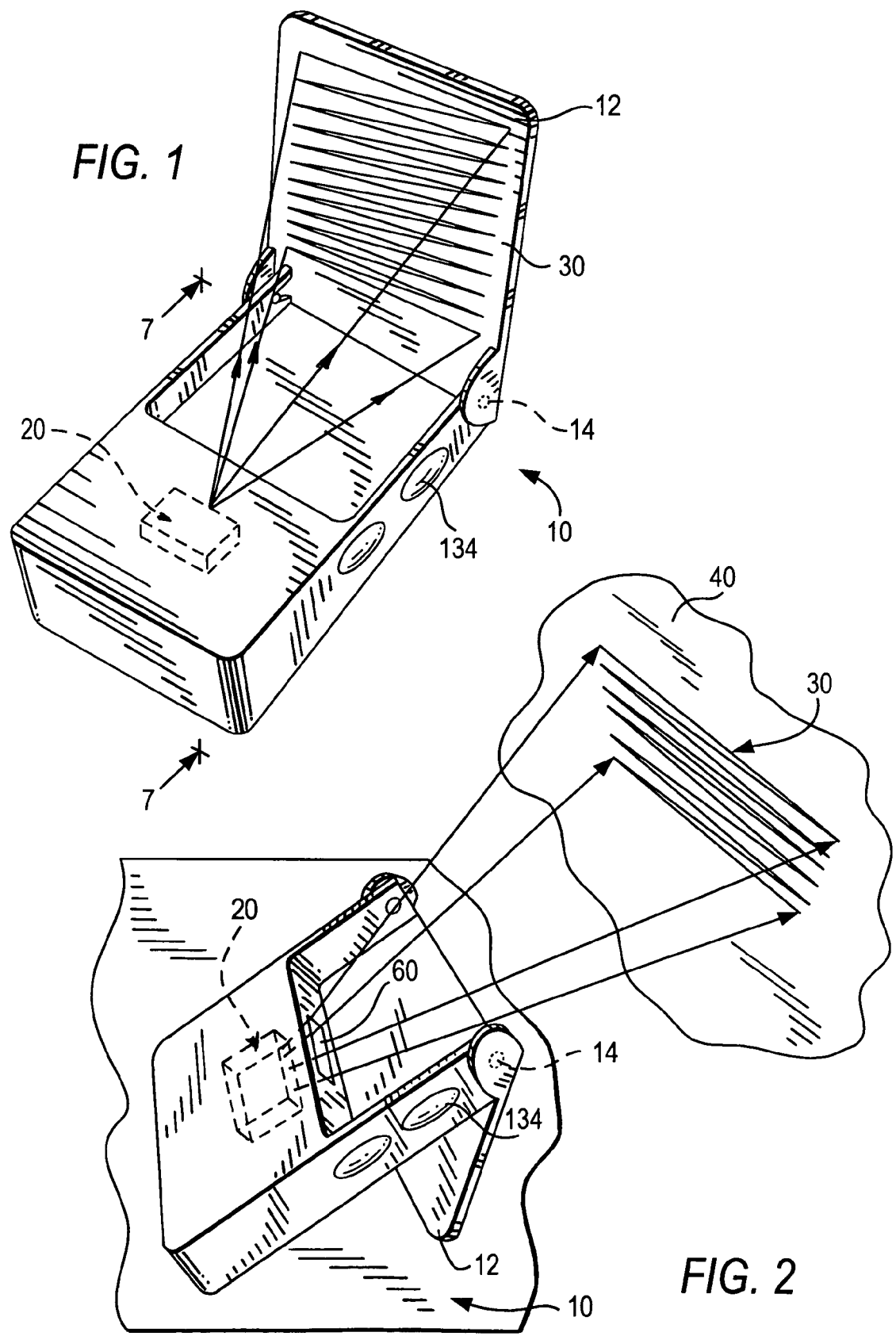
FIG. 1 is a perspective view of an arrangement for projecting an image at one image plane in accordance with this invention.
FIG. 2 is a perspective view of the arrangement of FIG. 1 for projecting an image at another image plane in accordance with this invention.
Figure 3:
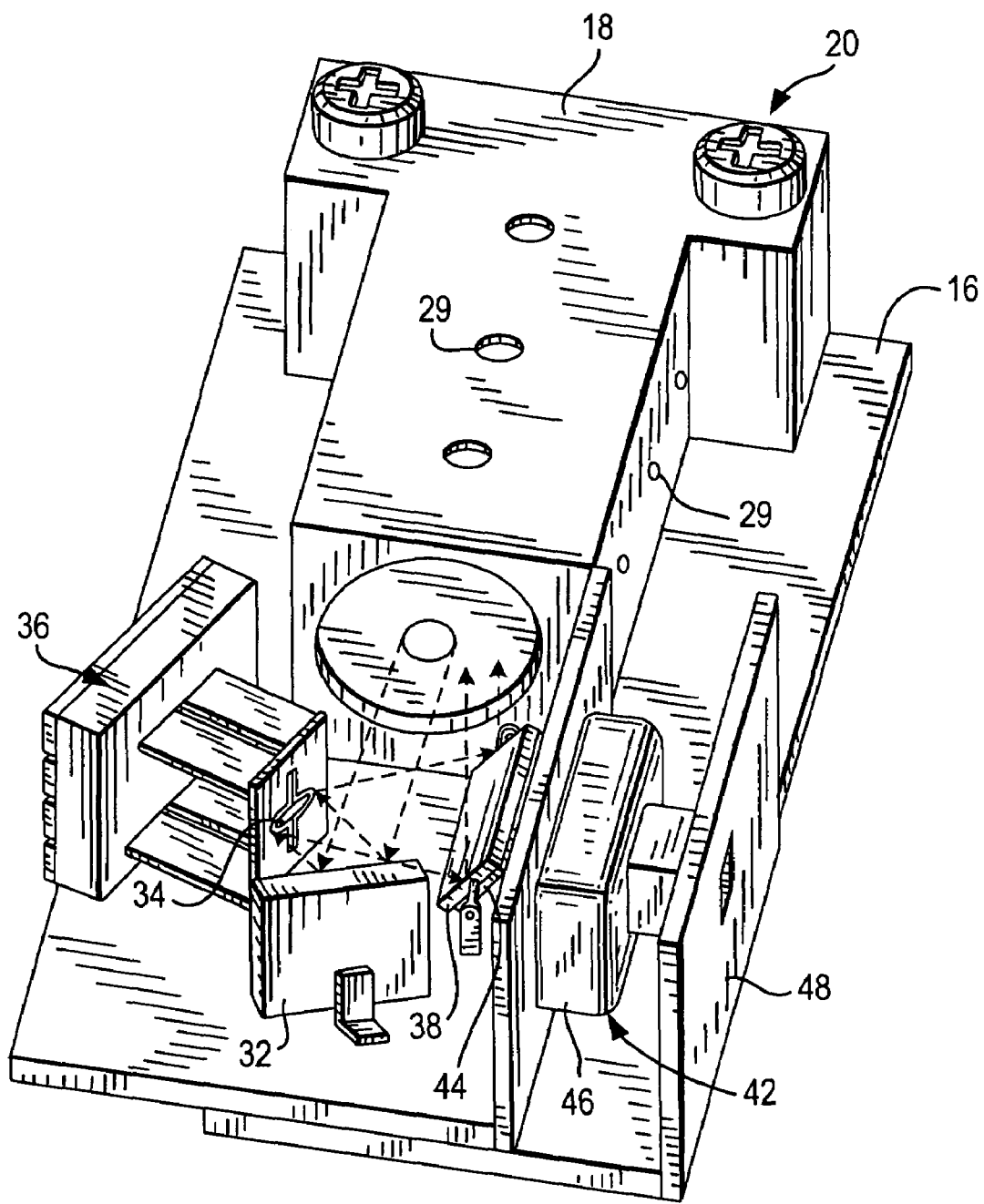
FIG. 3 is an enlarged, overhead, perspective view of an image projection module for installation in the arrangement of FIG. 1.

Reference numeral 10 in FIG. 1 generally identifies a housing in which a lightweight, compact, image projection module 20, as shown in FIG. 2, is mounted. The module 20 is operative for projecting a two-dimensional image at a distance from the module at different image planes. As described below, the image is comprised of illuminated and non-illuminated pixels on a raster pattern 30 of scan lines swept by a scanner in module 20.

The parallelepiped shape of the housing 10 represents just one form factor in which the module 20 may be incorporated. In the preferred embodiment, the module 20 measures about 30 mm×15 mm×10 mm or about 4.5 cubic centimeters. This compact, miniature size allows the module 20 to be mounted in housings of many diverse shapes, large or small, portable or stationary, some of which are described below.

Referring to FIG. 2, the module 20 includes a support 16, for example, a printed circuit board, and a laser/optics casing 18 in which are mounted a laser 25 (see FIG. 6) and a lens assembly, including one or more lenses and preferably a pair of lenses 22, 24 operative for optically modifying a laser beam emitted by the laser 25.

Figure 6:
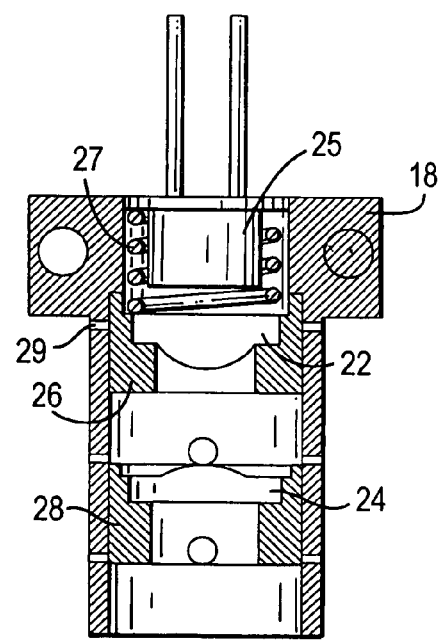
FIG. 6 is an enlarged sectional view of the laser/optics assembly of the module as taken on line 6-6 of FIG. 4.
Figure 5:
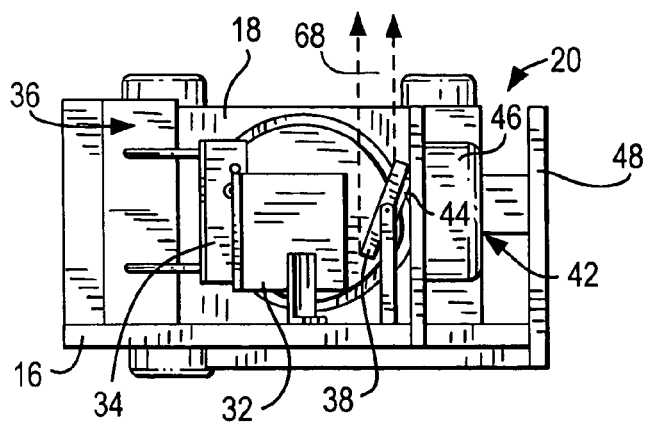
FIG. 5 is an end elevational view of the module of FIG. 2.

As best seen in FIG. 6, the laser 25 is a solid-state laser, preferably, a semiconductor laser, which, when energized, emits a laser beam having an oval cross-section. Lens 22 is a biaspheric convex lens having a positive focal length of about 2 mm and is operative for collecting virtually all the energy in the beam and for producing a diffraction-limited beam. Lens 24 is a concave lens having a negative focal length of about −20 mm. Lenses, 22, 24 are held by respective lens holders 26, 28 about 4 mm apart inside the casing 18 and are fixed in place by allowing an adhesive (not illustrated for clarity) introduced during assembly into the fill holes 29 to set. A coil spring 27 assists in positioning the laser. The lenses 22, 24 shape the beam profile.

The laser beam exiting the casing 18 is directed to, and reflected off, an optional stationary bounce mirror 32. A scanner is also mounted on the board 16 and includes a first scan mirror 34 oscillatable by an inertial drive 36 at a first scan rate to sweep the laser beam reflected off the bounce mirror over the first horizontal scan angle A (see FIG. 7), and a second scan mirror 38 oscillatable by an electromagnetic drive 42 at a second scan rate to sweep the laser beam reflected off the first scan mirror 34 over the second vertical scan angle B (see FIG. 7). In a variant construction, the scan mirrors 34, 38 can be replaced by a single two-axis mirror.

The inertial drive 36 is a high-speed, low electrical power-consuming component. Details of the inertial drive can be found in U.S. patent application Ser. No. 10/387,878, filed Mar. 13, 2003, assigned to the same assignee as the instant application, and incorporated herein by reference thereto. The use of the inertial drive reduces power consumption of the module to less than one watt.

The electromagnetic drive 42 includes a permanent magnet 44 jointly mounted on and behind the second scan mirror 38, and an electromagnetic coil 46 operative for generating a periodic magnetic field in response to receiving a periodic drive signal. The coil 46 is adjacent the magnet 44 so that the periodic field magnetically interacts with the permanent field of the magnet 44 and causes the magnet and, in turn, the second scan mirror 38 to oscillate. The coil 46 is supported by an upright wall 48 connected to the board 16.

The inertial drive 36 oscillates the scan mirror 34 at a high speed at a scan rate preferably greater than 5 kHz and, more particularly, on the order of 18 kHz or more. This high scan rate is at an inaudible frequency, thereby minimizing noise and vibration. The electromagnetic drive 42 oscillates the scan mirror 38 at a slower scan rate on the order of 40 Hz which is fast enough to allow the image to persist on a human eye retina without excessive flicker.

The faster mirror 34 sweeps a horizontal scan line, and the slower mirror 38 sweeps the horizontal scan line vertically, thereby creating a raster pattern which is a grid or sequence of roughly parallel scan lines from which the image is constructed. Each scan line has a number of pixels. The image resolution is preferably VGA quality of 640×480 pixels. In some applications, a one-half VGA quality of 320×480 pixels, or one-fourth VGA quality of 320×240 pixels, is sufficient. At minimum, a resolution of 160×160 pixels is desired.

The roles of the mirrors 34, 38 could be reversed so that mirror 38 is the faster, and mirror 34 is the slower. Mirror 34 can also be designed to sweep the vertical scan line, in which event, mirror 38 would sweep the horizontal scan line. Also, the inertial drive can be used to drive the mirror 38. Indeed, either mirror can be driven by an electromechanical, electrical, mechanical, electrostatic, magnetic, or electromagnetic drive.

The image is constructed by selective illumination of the pixels in one or more of the scan lines. As described below in greater detail with reference to FIG. 8, a controller causes selected pixels in the raster pattern 30 to be illuminated, and rendered visible, by the laser beam. For example, a power controller 50 conducts an electrical current to the laser 25 to energize the latter to emit light at each selected pixel, and does not conduct an electrical current to the laser 25 to deenergize the latter to non-illuminate the other non-selected pixels. The resulting pattern of illuminated and non-illuminated pixels comprise the image, which can be any display of human- or machine-readable information or graphic. Instead of a power controller, an acousto-optical modulator could be used to deflect the laser beam away from any desired pixel to non-illuminate the pixel by not allowing the laser beam to reach the first scan mirror.

Figure 7:
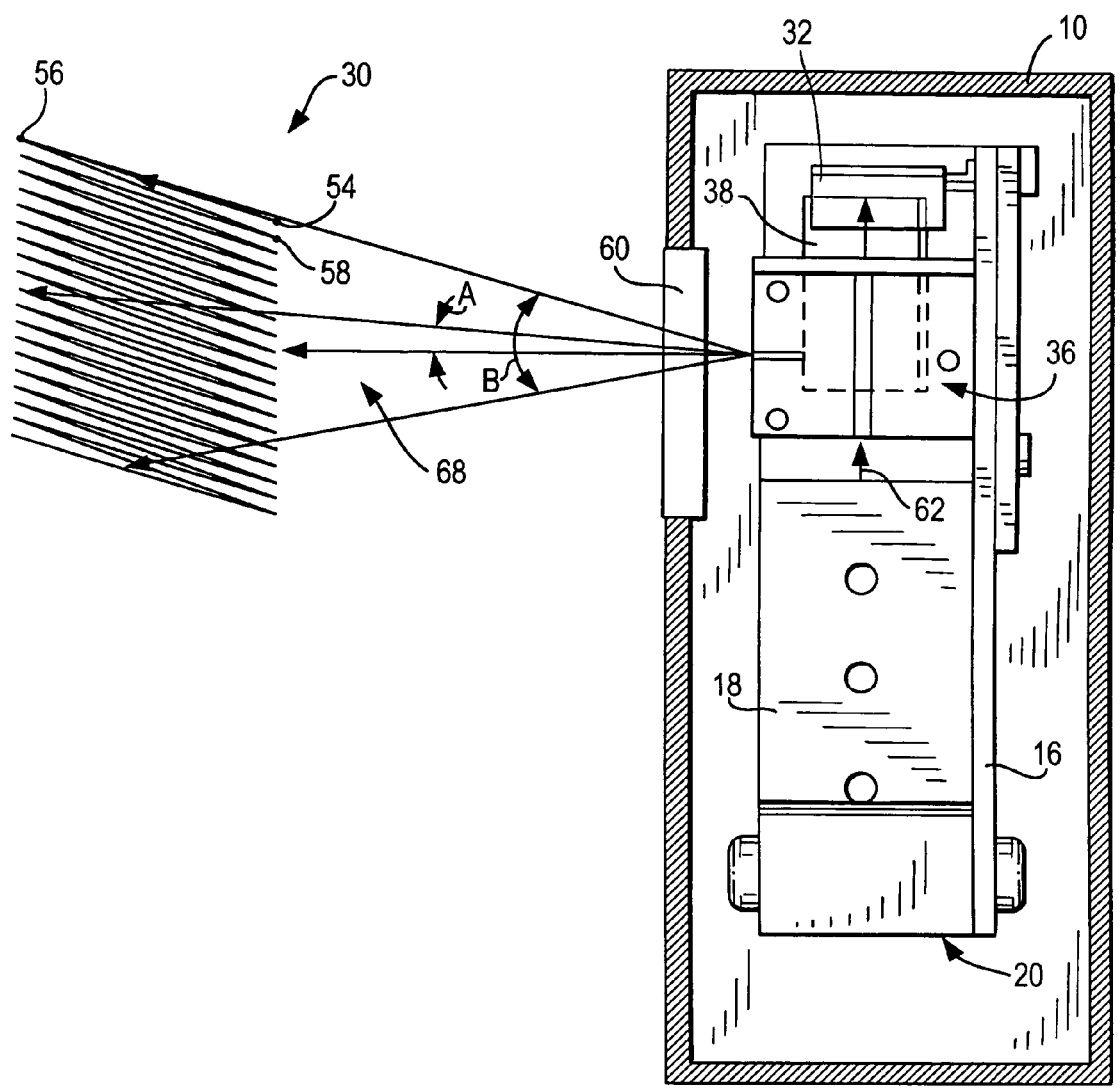
FIG. 7 is an enlarged sectional view taken on line 7-7 of FIG. 1.

Referring to FIG. 7, the raster pattern 30 is shown in an enlarged view. Starting at point 54, the laser beam is swept by the inertial drive along the horizontal direction at the horizontal scan rate to the point 56 to form a scan line. Thereupon, the laser beam is swept by the electromagnetic drive along the vertical direction at the vertical scan rate to the point 58 to form a second scan line. The formation of successive scan lines proceeds in the same manner.

The image is created in the raster pattern 30 by energizing or pulsing the laser on and off at selected times under control of a microprocessor or control circuit by operation of the power controller 50, or by maintaining the laser on and deflecting the laser beam at selected times by operation of an acousto-optical modulator. The laser produces visible light and is turned on, or its beam is properly deflected, only when a pixel in the desired image is desired to be seen. The raster pattern is a grid made of multiple pixels on each line, and of multiple lines. The image is a bit-map of selected pixels. Every letter or number, any graphical design or logo, and even machine-readable bar code symbols, can be formed as a bit-mapped image.

Figure 4:
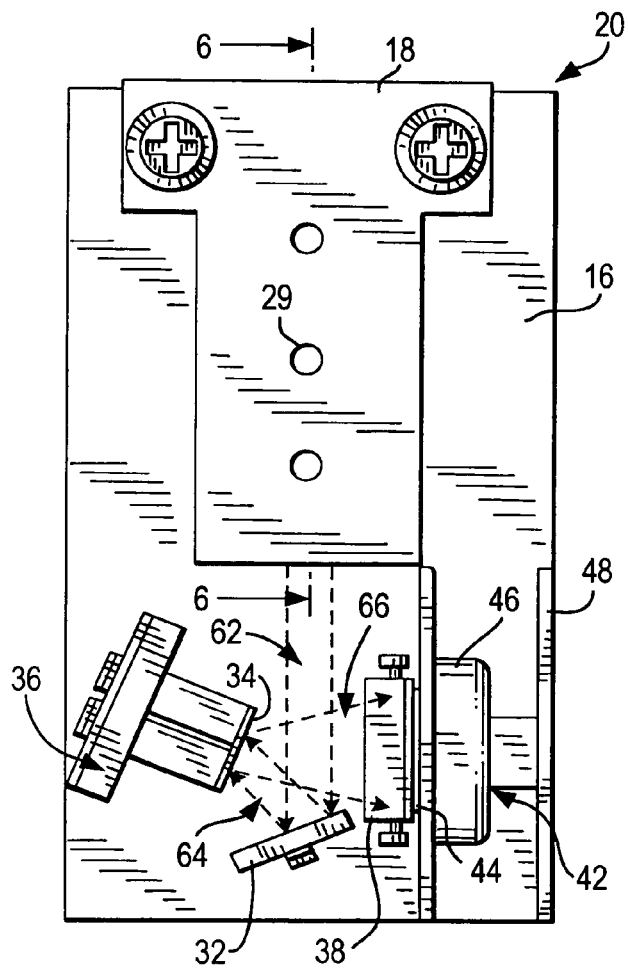
FIG. 4 is a top plan view of the module of FIG. 3.

FIG. 7 also shows a light-transmissive port or window 60 on the housing 10 and through which the image is projected in a direction generally perpendicular to the printed circuit board 16. Again, with reference to FIG. 4, the optical path of the laser beam has a vertical leg 62 between the laser/optics casing 18 and the bounce mirror 32, an inclined leg 64 toward the left to the scan mirror 34, a horizontal leg 66 toward the right to the scan mirror 38, and a forward leg 68 (see FIG. 7) in a direction toward the window 60 and perpendicular to the board 16. The image can be projected on any translucent or reflective surface, such as screen 12.

Figure 8:
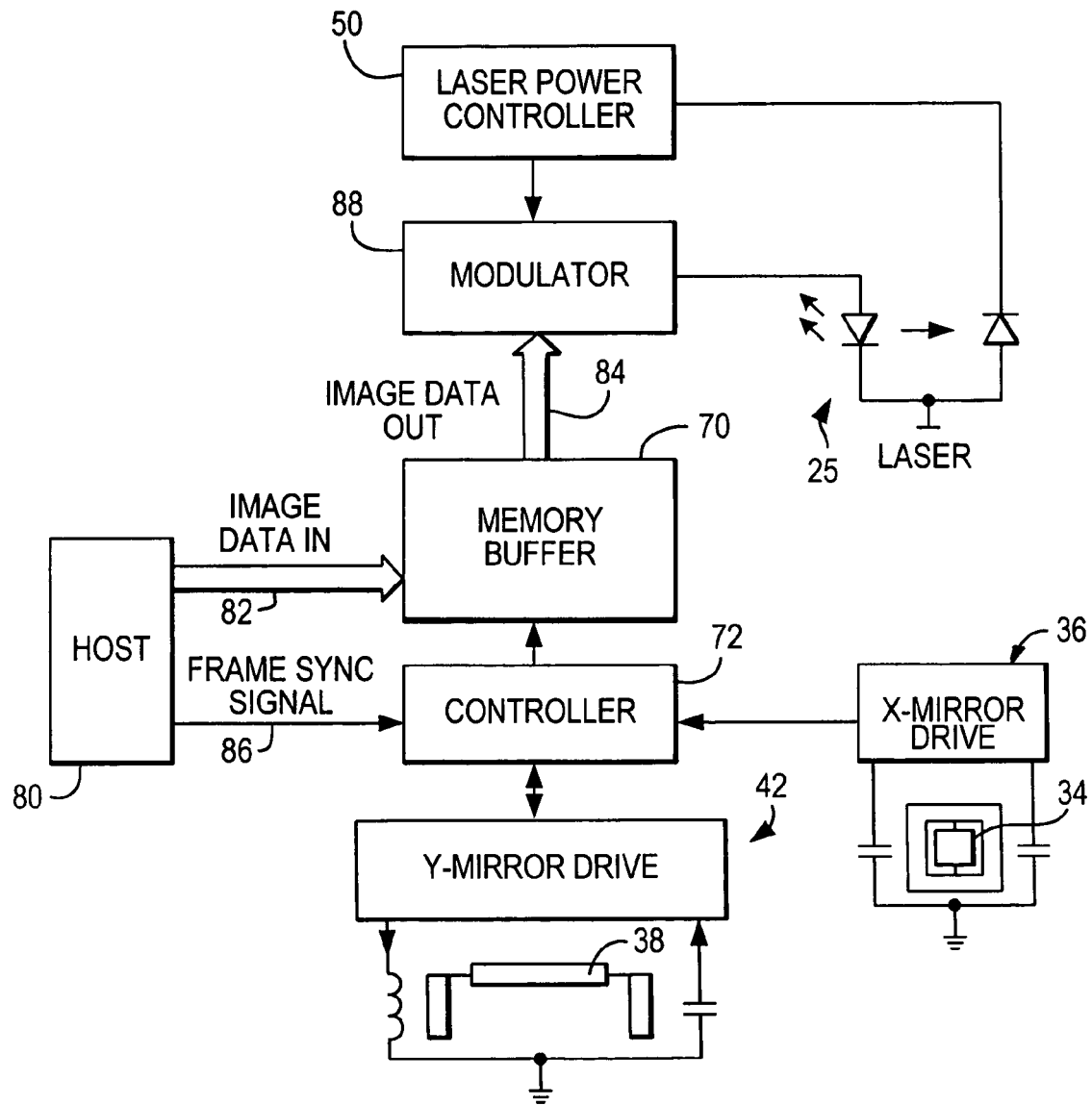
FIG. 8 is an electrical schematic block diagram depicting operation of the module of FIG. 3.

As shown in FIG. 8, a host 80 sends the bit-mapped image data 82 to a memory buffer 70 which is controlled by a memory controller 72. The storage of one full VGA frame would require about 300 kilobytes, and it would be desirable to have enough memory in the buffer 70 for two full frames (600 kilobytes) to enable one frame to be written by the host, while another frame is being read and projected. On the other hand, if the size of the buffer is smaller than a full frame, then the controller 72 can begin displaying lines after the memory has reached its maximum storage capacity with data sent by the host, or there can be simultaneous reading from and writing to the buffer. A frame synchronization signal 86 is sent by the host to the controller 72.

The first scan mirror 34, also known as the high speed or X-axis mirror, is driven by the inertial drive 36 and is controlled by the memory controller 72. Similarly, the second scan mirror 38, also known as the slow speed or Y-axis mirror, is driven by the electromagnetic drive 42 and is controlled by the memory controller 72. Since the image is projected during both forward and backward scans of the X-axis mirror, every other line of image data is displayed in reverse order. Hence, either the host has to write the image data to the buffer in the reverse order, or the memory controller has to read the image data in the reverse order.

The X-axis mirror has a sinusoidal velocity profile. In a given time interval, the laser beam sweeps more pixels in the middle of each scan line than at the ends of each scan line. To avoid image distortion, either the memory controller 72 should clock the pixels at a variable clock rate, or the host should fill the buffer 70 with data in which the size of the pixels is varied. A variable clock rate is the preferred technique since it allows pixels of a fixed size to be shared with other displays.

The output of the buffer is a digital signal 84 which is frame-synchronized with the host, and clock-and line-synchronized with the X-axis mirror 34. This digital signal is sent to a modulator 88 which, in turn, controls the laser 25.

Figure 9:
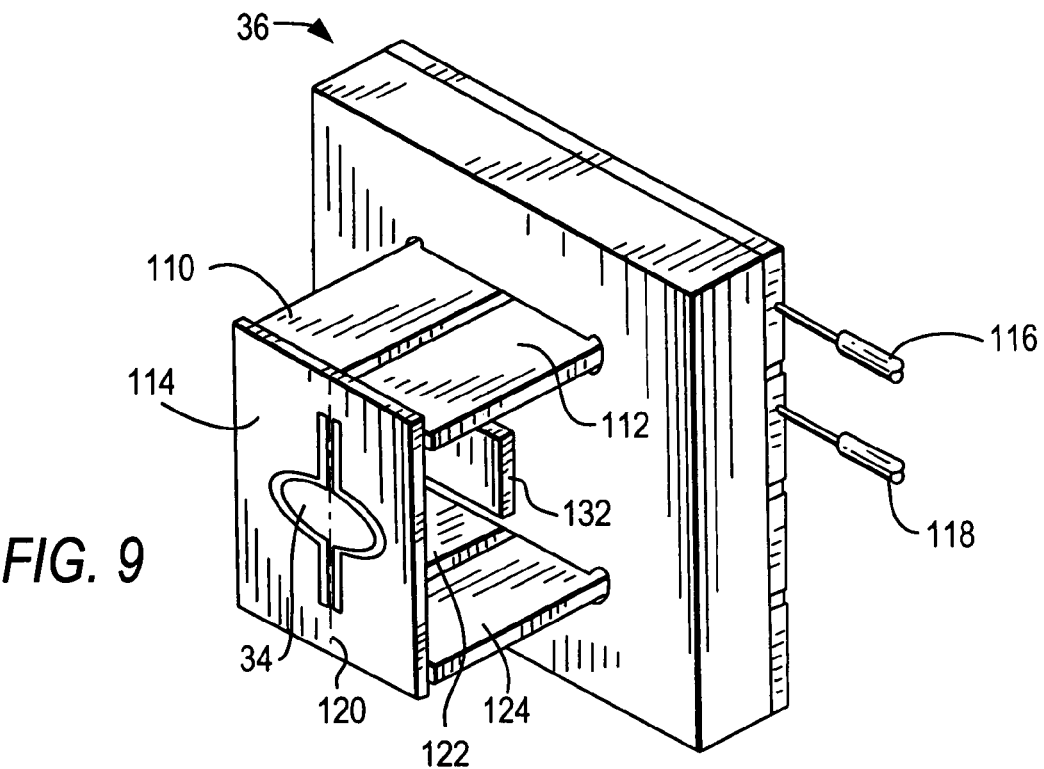
FIG. 9 is a front perspective view of a drive for the module of FIG. 2.
Figure 10:
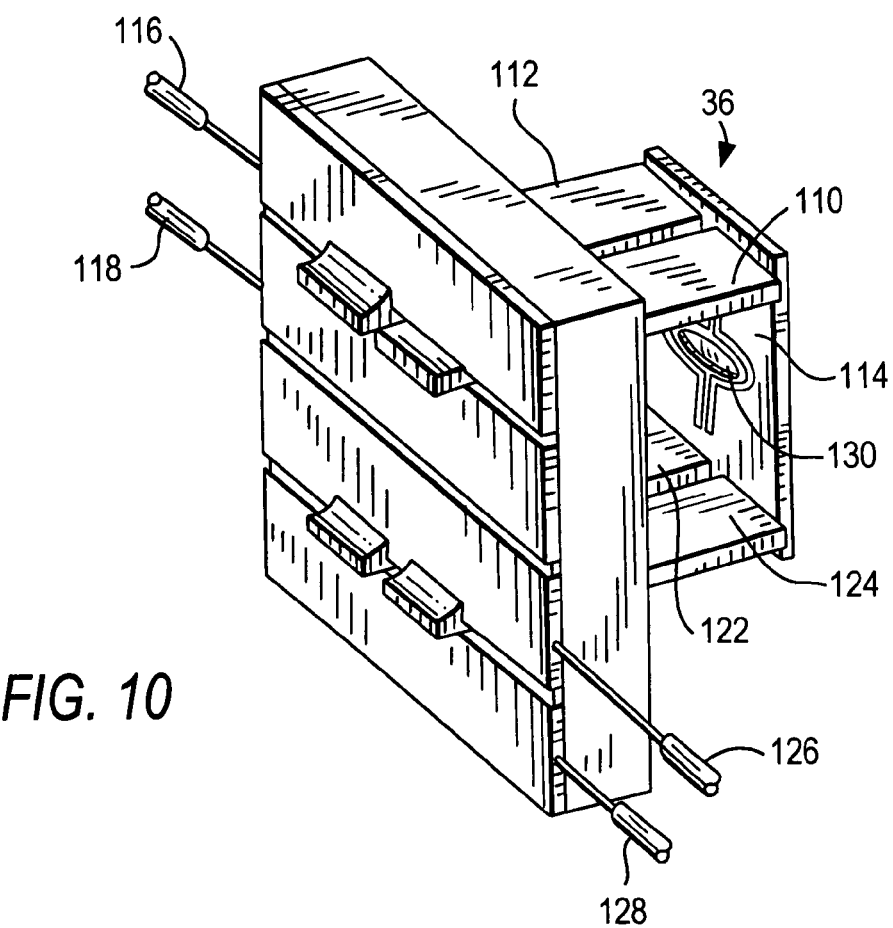
FIG. 10 is a rear perspective view of the drive of FIG. 9.
Figure 11:
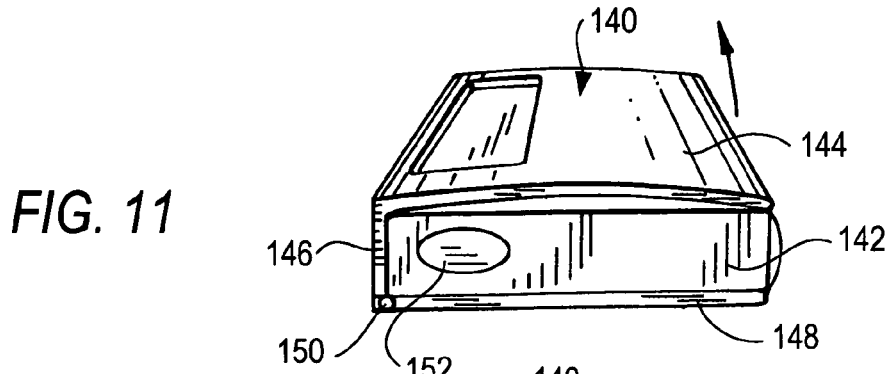
FIG. 11 is a perspective view of another arrangement in accordance with this invention in a closed position.
Figure 12:
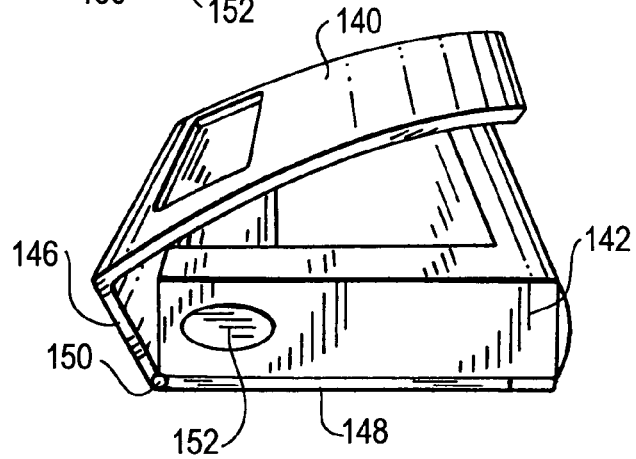
FIG. 12 is a perspective view of the arrangement of FIG. 11 with a lifted cover.

FIGS. 9-10 depict the inertial drive 36 in isolation. As described in the aforementioned U.S. patent application Ser. No. 10/387,878, filed Mar. 13, 2003, an upper pair of piezoelectric transducers 110, 112 contacts spaced-apart portions of a frame 114 above the scan mirror 34 and is electrically connected by wires 116, 118 to a periodic alternating voltage source. In use, the periodic source causes the transducers 110, 112 to alternatingly extend and contract in length, thereby causing the frame 114 to twist about a hinge axis 120. The scan mirror 34 is connected to the frame at opposite ends of the hinge axis and oscillates about the hinge axis at a resonant frequency.

A lower pair of piezoelectric transducers 122, 124 contacts spaced-apart locations of the frame 114 below the scan mirror 34. The transducers 122, 124 serve as feedback or pick-up mechanisms to monitor the oscillating movement of the frame and to generate and conduct electrical feedback signals along wires 126, 128 to a feedback control circuit.

However, vibrations induced by the transducers 110, 112 are detected by the transducers 122, 124 and tend to corrupt the feedback signals, thereby adversely affecting the projected image. Hence, the drive and pick-up mechanisms are preferably made different, for example, by not basing both mechanisms on the piezoelectric effect. One of the mechanisms is based on a different type of mechanism. For example, as shown in FIG. 10, a magnet 130 is jointly mounted behind the mirror 34 for joint oscillation therewith, and an electromagnetic feedback coil 132, as shown in FIG. 9, is mounted adjacent the magnet 130. The coil 132 senses the periodic electromagnetic field induced by the moving magnet and is immune from vibrations from the transducers 110, 112.

Returning to FIGS. 1-2, the screen 12 is pivotably mounted on the housing 10 at pivots 14 to any one of a plurality of positions. For example, as shown in FIG. 1, the screen 12 lies in a vertical plane, and the bit-mapped image of the raster pattern 30 is projected through the window 60 by the module 20 onto the vertical screen, which defines an image plane. The screen 12 can be tilted back to form an obtuse angle with the horizontal for more convenient viewing from the front of the housing, thereby defining another image plane. Other angles, including acute angles, could also be employed. As shown in FIG. 2, the screen 12 can be pivoted to an angular position in which the screen supports the housing 10 in a tilted position, in which case, the image is not projected on the screen, but instead, is projected on a remote display surface, such as a wall 40, which defines still another image plane. An actuator 134 is manually depressed to initiate the image projection. Thus, in the embodiment of FIGS. 1-2, the image can be projected on-board the housing 10 on the screen 12 in any one of a multitude of angular positions, or off-board the housing on the wall 40, or some other analogous display surface.

Figure 13:
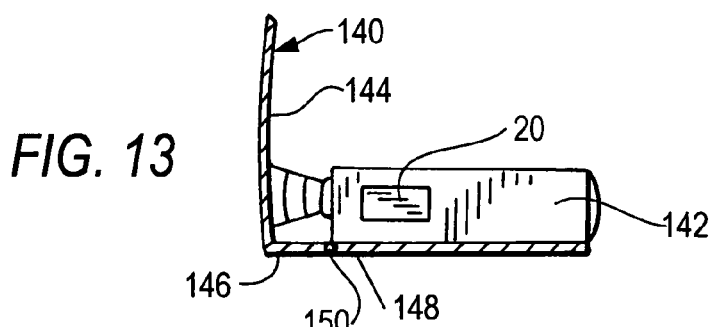
FIG. 13 is a side view of the arrangement of FIG. 11 with a screen in one image plane.
Figure 14:
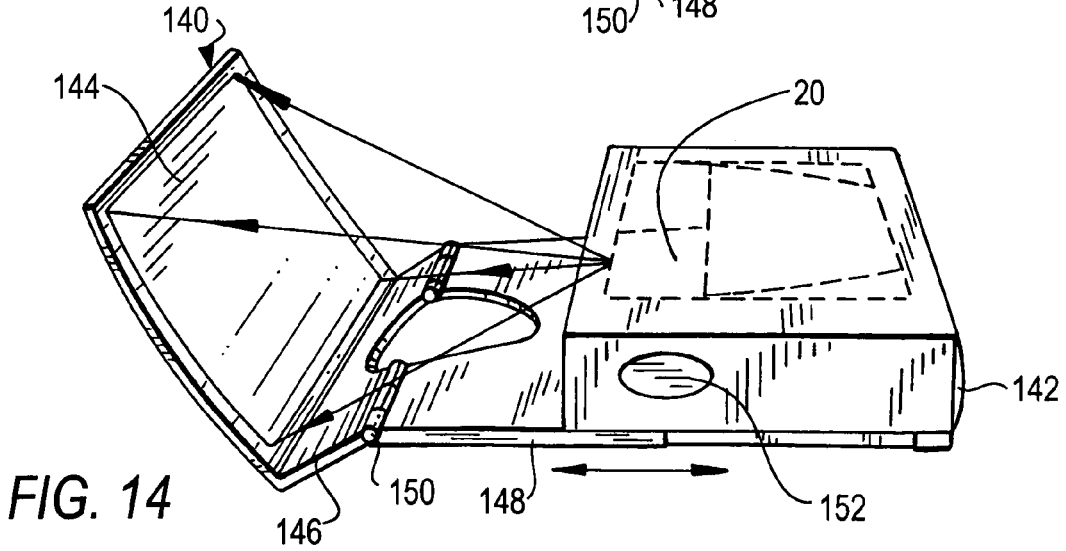
FIG. 14 is a perspective view of the arrangement of FIG. 11 with the screen in another image plane.

Turning to the embodiment of FIGS. 11-14, a cover 140 is pivotably mounted on a housing 142 in which the image projection module 20 is contained. The cover 140 includes top, end and bottom parts 144, 146, 148 overlying top, end and bottom surfaces of the housing in FIG. 11. The top and end parts are pivoted about hinge 150 relative to the bottom part to multiple positions, one of which is shown in FIG. 13, in which the top part 144 lies in a vertical plane and serves as a display screen lying in an image plane. As shown in FIG. 14, the top and end parts can be further tilted back so that the top part forms an obtuse angle relative to the horizontal, thereby defining still another image plane. The bottom part 148 is slidable toward and away from the housing to position the display screen in any desired position at a selected distance from the housing. Again, an actuator 152 is manually actuated to initiate the image projection at the desired image plane.

Figure 15:
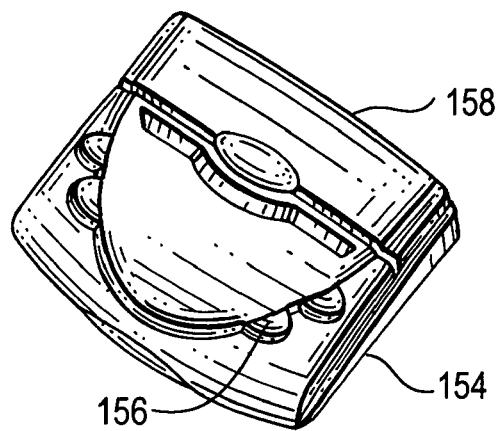
FIG. 15 is a perspective view of another image projection arrangement in accordance with this invention.
Figure 16:
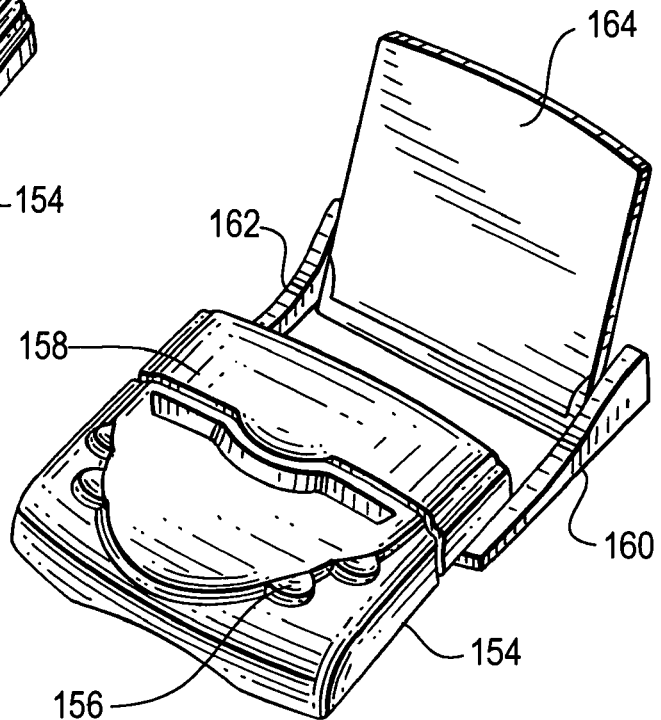
FIG. 16 is a perspective view of the arrangement of FIG. 15 with a deployed display screen.
Figure 17:
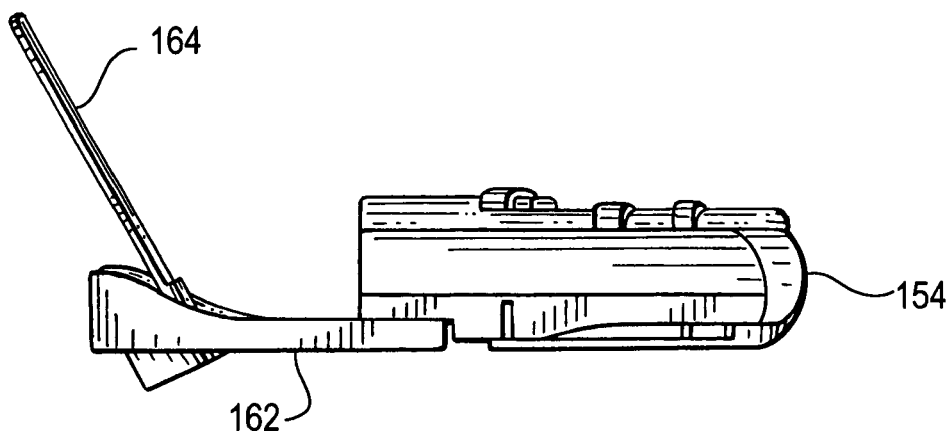
FIG. 17 is a side elevational view of the arrangement of FIG. 16.
Figure 18:
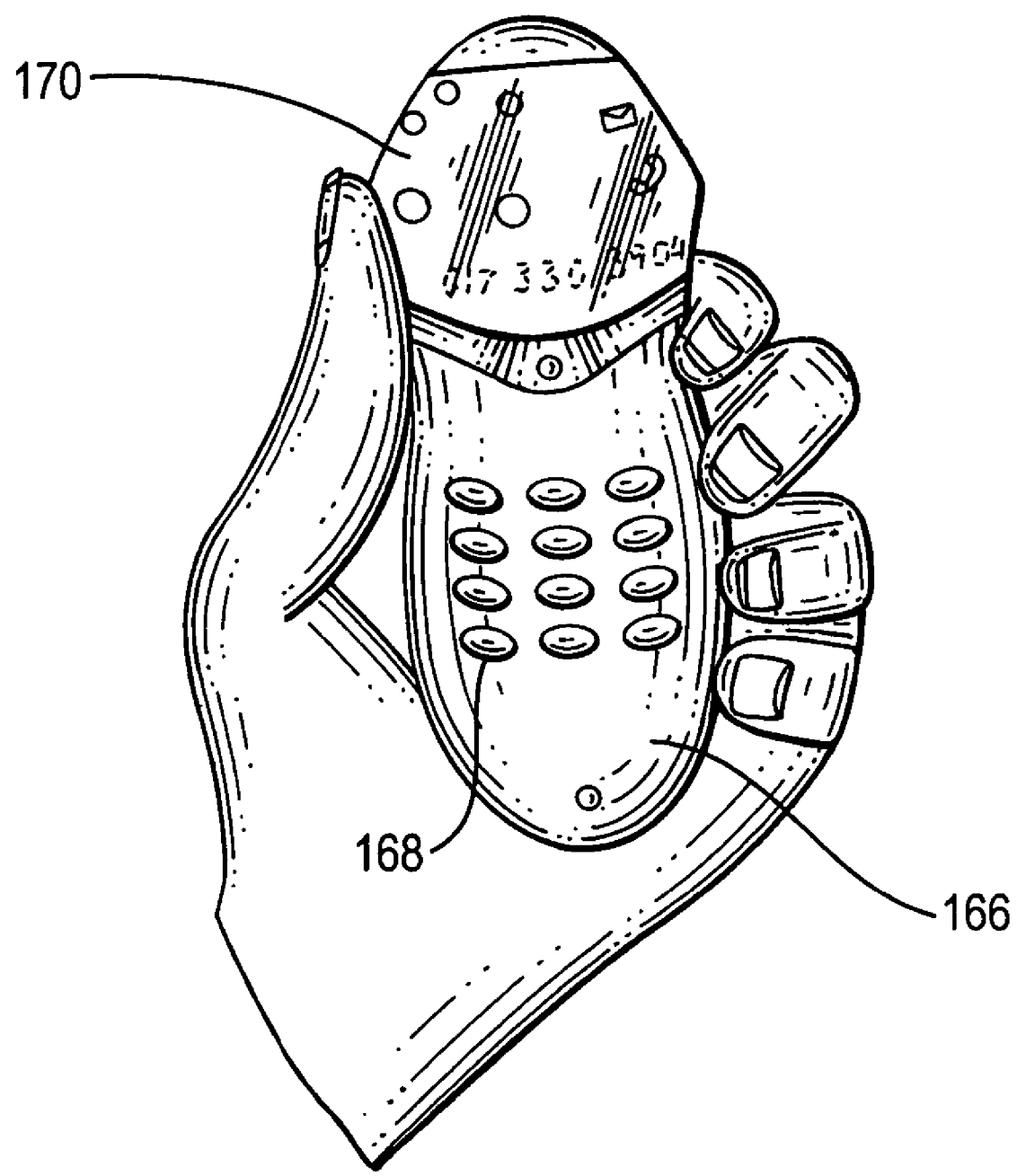
FIG. 18 is a perspective view of still another image projection arrangement in accordance with this invention.
Figure 19:
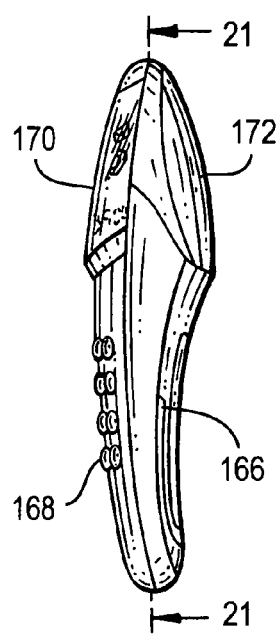
FIG. 19 is a side elevational view of the arrangement of FIG. 18.
Figure 20:
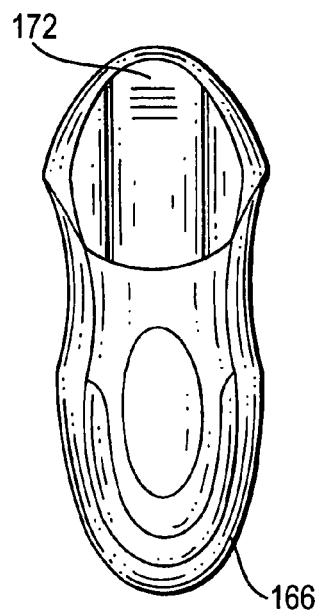
FIG. 20 is a rear elevational view of the arrangement of FIG. 18.

Turning to the embodiment of FIGS. 15-17, a housing 154 has keypad buttons 156 and an on-board display 158. A pair of side arms 160, 162 is slidably mounted for linear movement on and relative to the housing. A display screen 164 is pivotably mounted on and between the arms 160, 162 and is movable to a multitude of angular positions, one of which is shown in FIGS. 16-17. An image projection module 20 is contained within the housing and is operative, as before, for projecting an image on the screen in any of its selected positions. Indeed, even if the screen 164 is flat, the projected image will pass unobstructed above the screen and project onto a remote surface, for example, the wall 40.

Figure 21:
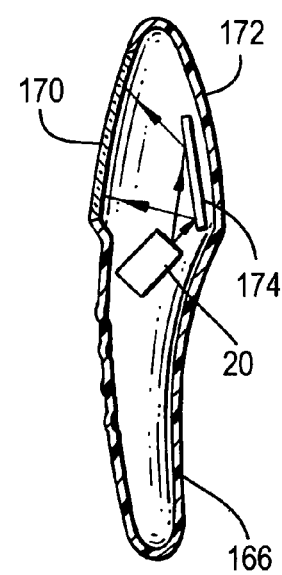
FIG. 21 is a sectional view taken on line 21-21 of FIG. 19.
Figure 22:
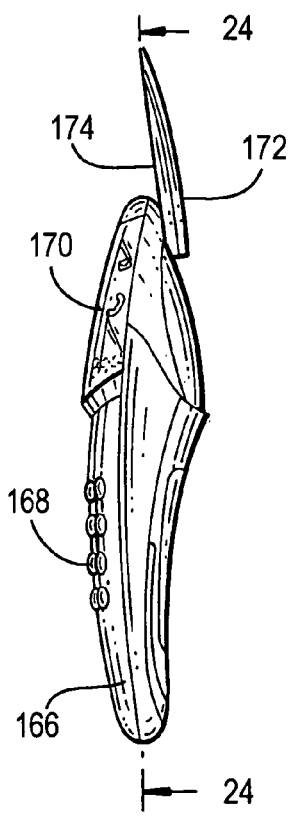
FIG. 22 is a view analogous to FIG. 19, but with a moved panel.
Figure 23:
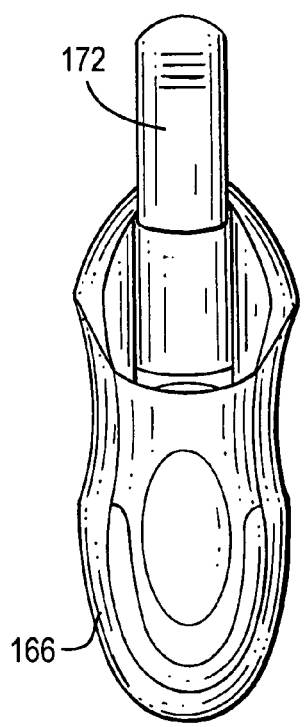
FIG. 23 is a view analogous to FIG. 20, but with a moved panel.
Figure 24:
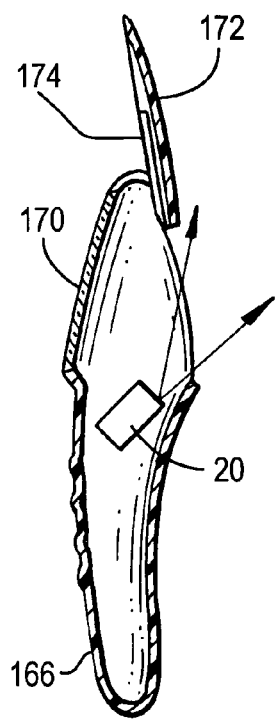
FIG. 24 is a sectional view taken on line 24-24 of FIG. 22.

Turning to the embodiment of FIGS. 18-24, a housing 166 has keypad buttons 168 and an on-board display 170. A rear cover 172 is slidably mounted on and relative to the housing 166. A mirror 174 is jointly mounted on the cover 172. An image projection module 20 is contained within the housing and is operative for projecting an image onto the mirror 172 (when the cover is closed, as seen in FIG. 21) for reflection onto the display 170, or onto a display surface remote from the housing (when the cover is opened, as seen in FIG. 24).

Still another embodiment is depicted in FIGS. 25-27 in which a housing 176 has game controller buttons 178 and a cover 180 pivotably mounted on the housing. A pair of side arms 182, 184 is pivotably mounted at opposite side edges of the cover. A foldable, flexible display screen 186 is mounted on and between the arms 182, 184 which are outstretched to spread the flexible screen as a wide screen, i.e., one larger in width than that of the housing 176. A window 60 in the cover 180 passes the image projected by an image projection module 20 contained within the housing onto the screen.

As best seen in FIG. 26, the screen 186 is folded onto itself when the arms 182, 184 are folded into overlapping engagement. FIG. 27 depicts the housing 176 with its cover 180 closed.

Figure 28:
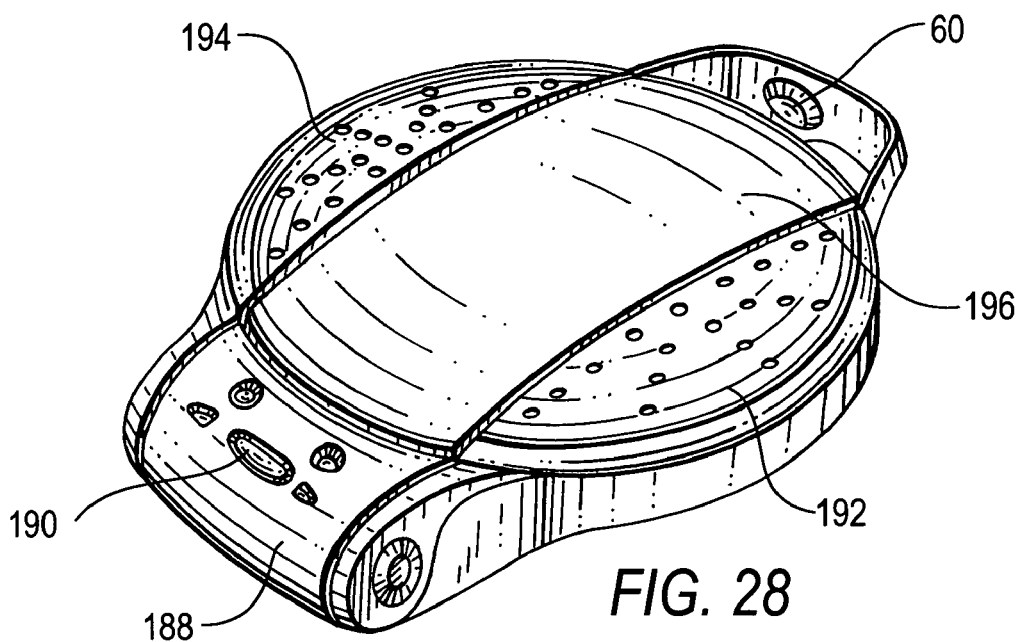
FIG. 28 is a perspective view of an additional image projection arrangement in accordance with this invention.
Figure 29:
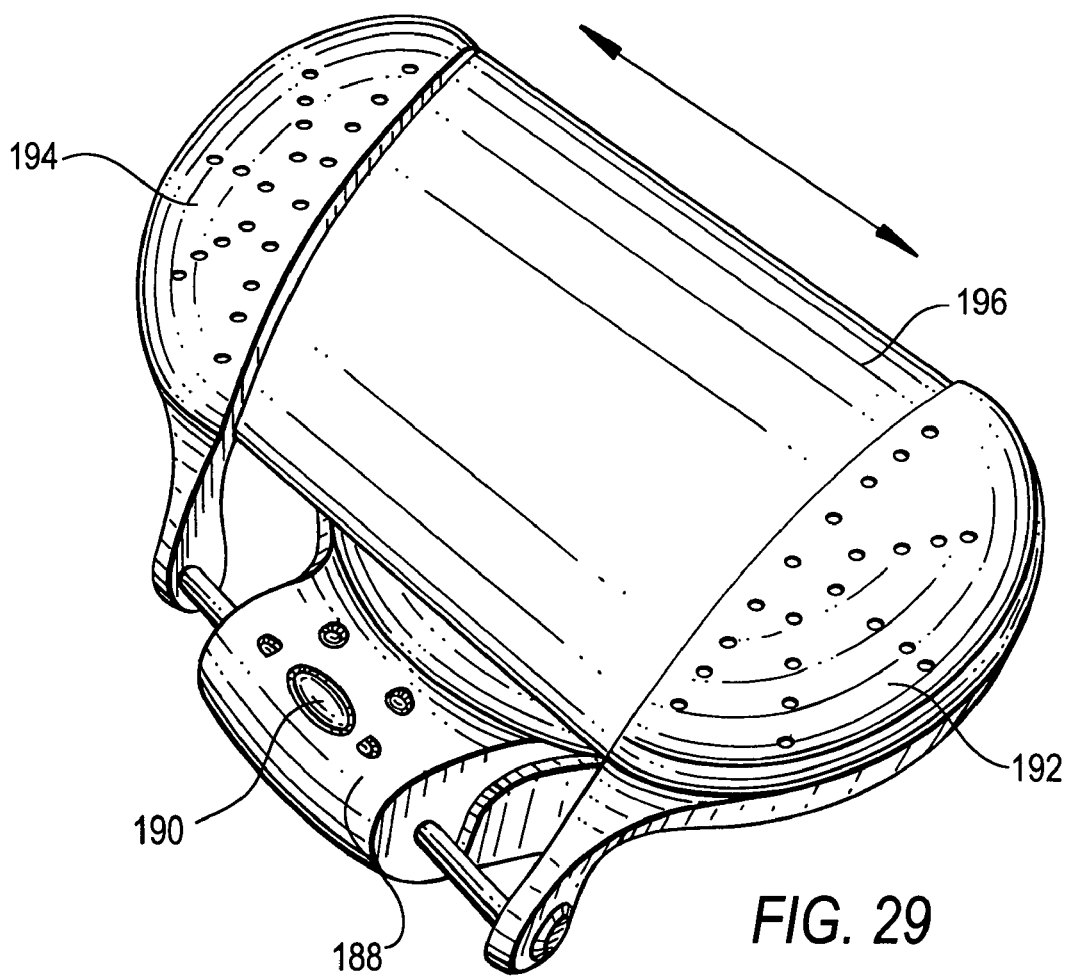
FIG. 29 is a perspective view of the arrangement of FIG. 28 during deployment of a display screen.

Still another embodiment of a wide screen display is shown in FIGS. 28-29, in which a housing 188 has controller buttons 190 and a pair of side pieces 192, 194 which are movable toward and away from each other at opposite sides of the housing 188. A flexible, stretchable display screen 196 is mounted on and between the side pieces 192, 194 which, when moved apart, stretch the screen 196 to a wider screen, i.e., one larger in width than that of the housing 188. A window 60 in the housing passes the image projected by an image projection module contained within the housing onto the screen.

It will be understood that each of the elements described above, or two or more together, also may find a useful application in other types of constructions differing from the types described above.

While the invention has been illustrated and described as embodied in an image projection arrangement for projecting images at different image planes, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. An arrangement for projecting two-dimensional images at different imaging planes, comprising:
   a housing having a window;
   an image projection module in the housing for sweeping a pattern of scan lines through the window, each scan line having a number of pixels, and for causing selected pixels to be illuminated, and rendered visible, to produce each image; and
   a movable panel pivotably mounted on the housing for pivoting movement among a plurality of first display positions in each of which a first two-dimensional image is projected onto a first display surface on the panel, and a second display position in which a second two-dimensional image is projected onto a second display surface remote from the housing, the panel being also operative for supporting the housing in a tilted state in the second display position.

2. An arrangement for projecting two-dimensional images, comprising:
   a housing having a window;
   an image projection module in the housing for sweeping a pattern of scan lines through the window, each scan line having a number of pixels, and for causing selected pixels to be illuminated, and rendered visible, to produce each image; and
   a foldable, flexible screen and a pair of arms attached to the flexible screen, the arms being mounted on the housing for movement between a folded position in which the flexible screen is folded over onto itself, and an unfolded position in which the arms spread the flexible screen on which the images are projected.

3. An arrangement for projecting two-dimensional images, comprising:
   a housing having a window;
   an image projection module in the housing for sweeping a pattern of scan lines through the window, each scan line having a number of pixels, and for causing selected pixels to be illuminated, and rendered visible, to produce each image; and
   a stretchable screen and a pair of arms attached to the stretchable screen, the arms being mounted on the housing for movement apart from each other to a spread position in which the arms spread the stretchable screen on which the images are projected.

4. A method of projecting two-dimensional images at different imaging planes, comprising the steps of:
   sweeping a pattern of scan lines through a window of a housing, each scan line having a number of pixels, and causing selected pixels to be illuminated, and rendered visible, to produce each image; and
   mounting a panel on the housing and pivotably moving the panel among a plurality of first display positions in each of which a first two-dimensional image is projected onto a first display surface on the panel, and a second display position in which a second two-dimensional image is projected onto a second display surface remote from the housing, and supporting the housing in a tilted state with the panel in the second display position.

5. A method of projecting two-dimensional images, comprising the steps of:
   sweeping a pattern of scan lines through a window of a housing, each scan line having a number of pixels, and causing selected pixels to be illuminated, and rendered visible, to produce each image; and
   attaching a pair of arms to a foldable, flexible screen, and mounting the arms on the housing for movement between a folded position in which the flexible screen is folded over onto itself, and an unfolded position in which the arms spread the flexible screen on which the images are projected.

6. A method of projecting two-dimensional images, comprising the steps of:
   sweeping a pattern of scan lines through a window of a housing, each scan line having a number of pixels, and causing selected pixels to be illuminated, and rendered visible, to produce each image; and
   attaching a pair of arms to a stretchable screen, and mounting the arms for movement apart from each other to a spread position in which the arms spread the stretchable screen on which the images are projected.

* * * * *